United States Patent
Houcke et al.

(10) Patent No.: US 7,995,692 B2
(45) Date of Patent: Aug. 9, 2011

(54) FRAME-SYNCHRONIZATION METHOD AND DEVICE

(75) Inventors: Sébastien Houcke, Brest Cedex (FR); Guillaume Sicot, Brest Cedex (FR)

(73) Assignee: France Telecom, Paris (FR)

( * ) Notice: Subject to any disclaimer, the term of this patent is extended or adjusted under 35 U.S.C. 154(b) by 637 days.

(21) Appl. No.: 11/884,562

(22) PCT Filed: Feb. 20, 2006

(86) PCT No.: PCT/FR2006/050145
§ 371 (c)(1),
(2), (4) Date: Jul. 9, 2008

(87) PCT Pub. No.: WO2006/087497
PCT Pub. Date: Aug. 24, 2006

(65) Prior Publication Data
US 2009/0154623 A1   Jun. 18, 2009

(30) Foreign Application Priority Data
Feb. 18, 2005 (FR) .................... 05 01748

(51) Int. Cl.
*H04L 7/00* (2006.01)
(52) U.S. Cl. .................................... 375/354
(58) Field of Classification Search .......... 375/354, 375/260, 355, 364; 714/785; 370/395.4, 370/246, 394; 371/5.1, 47.13, 54
See application file for complete search history.

(56) References Cited

U.S. PATENT DOCUMENTS

| 4,404,676 | A | | 9/1983 | Debenedictis et al. |
| 5,745,510 | A | * | 4/1998 | Choi ............................ 714/798 |
| 5,852,639 | A | | 12/1998 | Murakami et al. |
| 7,725,800 | B2 | * | 5/2010 | Yang et al. .................... 714/755 |

FOREIGN PATENT DOCUMENTS

EP   0 230 066 A   7/1987

OTHER PUBLICATIONS

J. Sodha et al., "Soft-Decision Syndrome Based Node Synchronization", Electronics Letters, vol. 26, No. 15, pp. 1108-1109, Jul. 19, 1990.
J. L. Masey et al., "Optimum Frame Synchronization", IEEE Transactions on Communications, vol. 20., No. 2, pp. 115-119, Apr. 1972.
R.A. Scholtz, "Frame Synchronization Techniques", IEEE Transactions on Communications, vol. 28, No. 8, pp. 1204-1212, Aug. 1980.
M. Mostofa et al., "Decoder-Assisted Channel Estimation and Frame Synchronization of Turbo Coded Systems", IEEE, pp. 1452-1456, 2002.

\* cited by examiner

*Primary Examiner* — Khai Tran
(74) *Attorney, Agent, or Firm* — Cohen Pontani Lieberman & Pavane LLP

(57) ABSTRACT

A frame synchronization method and device. The method determines the frame start position D. That position D is the same as a position of a window H sliding along the received frame $T_r$. For various possible positions of the window H and for various blocks Bi of the window H, the method computes a syndrome $S_d^{(i)}$, and the start position D of the received frame $T_i$ is that for which the number of null elements of a syndrome $S_d^{(i)}$ is highest.

11 Claims, 3 Drawing Sheets

FRAME-SYNCHRONIZATION METHOD AND DEVICE

RELATED APPLICATIONS

This is a U.S. National Phase Application under 35 USC 371 of International Application PCT/FR2006/050145 filed on Feb. 20, 2006.

FIELD OF THE INVENTION

The present invention relates to the field of telecommunications. Within that field, the invention relates more particularly to digital communications. Digital communications include wireless communications, where the transmission channel is a radio channel, and cable communications.

BACKGROUND OF THE INVENTION

Digital communications are making more and more use of more or less sophisticated channel coding. The principle of channel coding is to add controlled redundancy to information bits to enable the receiver to detect and possibly correct transmission errors. The existing codes include in particular block codes which cause a code word of size $n_c$ to correspond to a block of $n_b$ information bits, with $n_c > n_b$. These additional bits are used to correct some transmission errors; the greater the number of redundant bits, the greater the correction capability of the code. To decode and correct errors, the receiver must be in a position to find the beginning of the code words in the bit sequence in order to be able to decode them correctly. This operation is usually referred to as frame synchronization.

The invention is concerned with frame synchronization techniques.

Frame synchronization is generally effected by periodically adding to the message to be transmitted an uncoded synchronization sequence known to the receiver. That sequence is then detected in the receiver to enable synchronization of the frame to be decoded. This kind of sequence is described in the following papers: "Optimum Frame Synchronisation", James L. Massey, IEEE Transactions on Communications, Vol. Com-20, No. 2, April 1972, and "Frame Synchronisation Techniques" Robert A. Scholtz, 0090-6778/80/0800-1204$00.75, 1980 IEEE. The enormous advances in channel coding, in particular with the introduction of turbo codes, means that data can now, be sent with low signal-to-noise ratios, which leads to numerous errors in the synchronization sequence and therefore to somewhat unreliable synchronization. A number of authors propose inserting a coded sequence; this means that some of the improvement in coding can be exploited and synchronization reliability thereby increased. One such sequence is described in the paper "Decoder-Assisted Channel Estimation and Frame Synchronisation of Turbo Coded Systems", M. Mostofa, K. Howlader, 0-7803-7484-3/02/$17.00, 2002 IEEE.

Those known techniques have the drawback of requiring the addition of a known sequence, which reduces spectral efficiency, i.e. lowers the usable bit rate.

SUMMARY OF THE INVENTION

One object of the present invention is to provide a method of synchronizing data frames constituting code words that does not have the drawback of the known methods and consequently offers improved spectral efficiency.

This and other objects are attained in accordance with one aspect of the present invention in which the frame synchronization method determines a start position D of a received frame $T_r$ by means of a window H sliding over the received frame $T_r$ of size $Kn_c$ divided into K blocks $B_i$ of size $n_c$ equal to that of a code word. The frame start position D is the same as one of several possible positions of the sliding window H along the received frame $T_r$. The method is such that, for various possible positions of the window H, it computes a syndrome $S_d^{(i)}$ for each block $B_i$, the start position D of the received frame $T_r$ being that for which the number of null elements of the syndromes $S_d^{(i)}$ computed for that position is the highest; the method determines beforehand the number of null elements for each syndrome $S_d^{(i)}$, each syndrome consisting of elements.

Another aspect of the invention is directed to a device for synchronizing frames of data constituting code words to determine a frame start position. The device comprises:
  windowing means sliding over a received frame $T_r$ of size $n_c$ divided into K blocks $B_i$ of size $n_c$ equal to that of a code word, the start position D of the received frame $T_r$ being the same as one of a plurality of possible positions of the sliding windowing means along the received frame $T_r$;
  means for computing a syndrome $S_d^{(i)}$ for various possible positions of the windowing means and for various blocks $B_i$ of the windowing means;
  means for determining a position for which the number of null elements of the syndromes $S_d^{(i)}$ computed for that position is the highest, the computation means determining a number of null elements of the syndrome $S_d^i$ beforehand in this case, the starting position D of the frame being the same as that position.

Thus a method and a device of the invention, which respectively relates to a synchronization method and a synchronization device, determine a frame start position by taking it as the same as the position of the sliding window that corresponds to the highest number of null elements.

The frame synchronization method and device of the invention solve the stated problem. The synchronization is of the self-taught type; it does not require any training sequence. Synchronization is based only on the properties of the block linear code.

Synchronization in accordance with the invention is particularly advantageous because eliminating the synchronization sequence makes it possible either to increase the usable bit rate or, retaining the same bit rate as before, to use codes having more redundant bits, i.e. to use codes of lower efficiency and therefore having a greater correction capability. The greater the number of redundant bits, the better the synchronization performance of a method of the invention.

Frame synchronization in accordance with the invention does not use a known sequence inserted into the coded frame; consequently, it does not require a synchronization sequence. It functions with any type of block code (BCH, RS, product code, LDPC, etc.). It does not require modification of the corrector code. It functions prior to decoding, i.e. it does not exploit the improvement in coding. It is not very complex and is effective even in the presence of a high bit error rate.

In a preferred embodiment, the steps of the method are determined by the instructions of a frame synchronization program incorporated in an electronic circuit such as a microchip that can be included in an electronic device such as a receiver. The frame synchronization method of the invention can equally be used if this program is loaded into a computation unit such as a processor or the like, with the operation thereof then being controlled by the execution of the program.

Another aspect of the invention is directed to a computer program, in particular a computer program on or in an information medium, adapted to implement the invention. This program can use any programming language and be in the form of source code, object code, or a code intermediate between source code and object code, such as in a partially compiled form, or in any other form desirable for implementing a method of the invention.

The information medium can be any entity or device capable of storing the program. For example, the medium can include storage means, such as ROM, for example a CD ROM or a microelectronic circuit ROM, or magnetic storage means, for example a diskette (floppy disk) or a hard disk.

The information medium can be a transmissible medium such as an electrical or optical signals which can be routed via an electrical or optical cable, by radio, or by other means. The program of the invention can in particular be downloaded over an Internet-type network.

Alternatively, the information medium can be an integrated circuit into which the program is incorporated and which is adapted to execute or to be used in the execution of the method in question.

BRIEF DESCRIPTION OF THE DRAWINGS

Other features and advantages of the invention become apparent in the course of the following description with reference to the appended drawings, which are provided by way of non-limiting example.

DETAILED DESCRIPTION OF THE DRAWINGS

Figure 1:
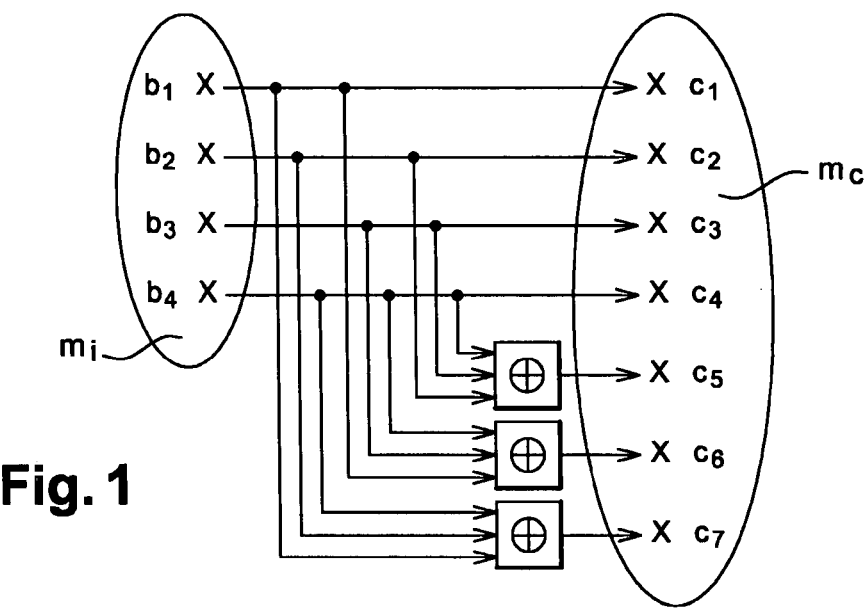
FIG. 1 is a theoretical diagram of block coding for a Hamming (7,4) code.

FIG. 1 represents a theoretical diagram of block coding for a Hamming (7,4) code. The principle of block coding is to add to the information bits $b_1, b_2, \ldots, b_4$ a controlled redundancy $c_5, c_6, c_7$ to enable the receiver to detect and possibly correct transmission errors. Block codes cause a code word of size $n_c$ bits to correspond to a block of $n_b$ information bits, with $n_c > n_b$. The $n_c - n_b$ redundant bits are computed as the modulo 2 sum of certain bits of the block of information bits. In particular, the Hamming (7,4) code has three redundant bits such that each bit is computed from three information bits. For example, the fifth bit of a code word coded with a Hamming (7,4) code is equal to the modulo 2 sum of the second, third and fourth information bits:

$c_5 = b_2 \oplus b_3 \oplus b_4$

For any block code, there is therefore a linear relationship between the code word $m_c$ and the corresponding information word $m_i$:

$m_c = m_i G$ where G is the generator matrix of the code word. This is a matrix of size $n_b \times n_c$. The generator matrix of the Hamming (7,4) code that corresponds to the example illustrated by FIG. 1 is equal to:

$$\begin{pmatrix} 1 & 0 & 0 & 0 & 0 & 1 & 1 \\ 0 & 1 & 0 & 0 & 1 & 0 & 1 \\ 0 & 0 & 1 & 0 & 1 & 1 & 0 \\ 0 & 0 & 0 & 1 & 1 & 1 & 1 \end{pmatrix}$$

The code is said to be systematic if the first $n_b$ bits of the code word correspond to the $n_b$ information bits. This applies in this example.

The receiver receives the code word sent, possibly affected by errors caused by the transmission channel. If r denotes the binary word received by the receiver, then r can be written in the form:

$r = m_c \oplus e$ in which $m_c$ is the code word sent, e is an error vector of length $n_c$ and $\oplus$ represents the modulo 2 sum.

The receiver must be in a position to restore the $n_b$ information bits from this observation r. This is the object of a decoding operation. The optimum decoding of binary data consists in finding the code word with the minimum Hamming distance from the observation r (i.e. the minimum number of separate bits in a bit by bit comparison).

The principle of decoding block codes is as follows.

The receiver has $n_c - n_b$ redundant bits for correcting $2^n - 1$ possible errors. The receiver can therefore correct only a fraction of the errors, and can only do this arbitrarily. Preference is generally given to correcting less significant error words, i.e. to correcting error vectors e having few non-null elements. To the code generator matrix there corresponds a parity matrix P of size $(n_c - n_b) \times n_c$ such that:

$$GP^T = 0 \tag{1}$$

The decoding method calculates the syndrome S(r) of the observation r:

$S(r) = rP^T = m_i GP^T \oplus (eP^T)$

From equation (1): $S(r) = eP^T$

The decoding method constructs from the matrix P the decoding matrix that associates a syndrome and an error word on a one-to-one basis, preference being assigned to the less significant error words.

$$\begin{pmatrix} 0 & 1 & 1 \\ 1 & 0 & 1 \\ 1 & 1 & 0 \\ 1 & 1 & 1 \\ 1 & 0 & 0 \\ 0 & 1 & 0 \\ 0 & 0 & 1 \end{pmatrix} \begin{pmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{pmatrix} \Leftrightarrow \begin{pmatrix} 0 & 1 & 1 \\ 1 & 0 & 1 \\ 1 & 1 & 0 \\ 1 & 1 & 1 \\ 1 & 0 & 0 \\ 0 & 1 & 0 \\ 0 & 0 & 1 \end{pmatrix} \tag{2}$$

$P^T \qquad\qquad E \qquad\qquad\qquad S(E)$

The decoding method deduces from the table (2) an estimate of the error e. It then sums the estimate of the error and the observation to effect the correction. If the syndrome is null, that means r is a code word.

The Hamming (7,4) code previously adopted is used to illustrate this method by means of an example. Consider an observation r equal to:

$r = [0001100]$

The method computes the syndrome of r:

$S(r) = rP^T = [011]$

This syndrome is non-null, and so r contains at least one error. Using the table (2), the method associates an error vector e of weight one with this syndrome:

e=[1000000]

The closest code word $m_c$ is therefore:

$m_c$=[1001100]

which corresponds to the information bit vector:

$m_i$=[1001]

Figure 2:
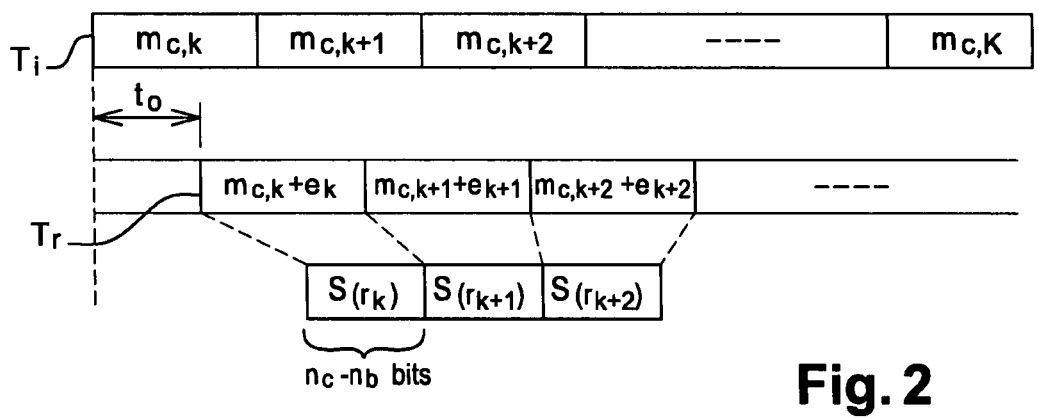
FIG. 2 is a diagram of the transmission delay of $t_0$ bits of a transmitted frame.

This decoding method assumes that the receiver knows the beginning of the code word. Now, transmission introduces not only errors in the transmitted frame but also a transmission delay of to bits (see FIG. 2) caused by the transmission time between the sent frame $T_i$ and the received frame $T_r$. This delay is not known a priori to the receiver, of course. To compute the syndrome $S(r_k)$ associated with the received code word $r_k$, the receiver must be in a position to estimate the transmission delay $t_0$; a synchronization method enables the receiver to estimate this delay $t_0$.

Figure 3:
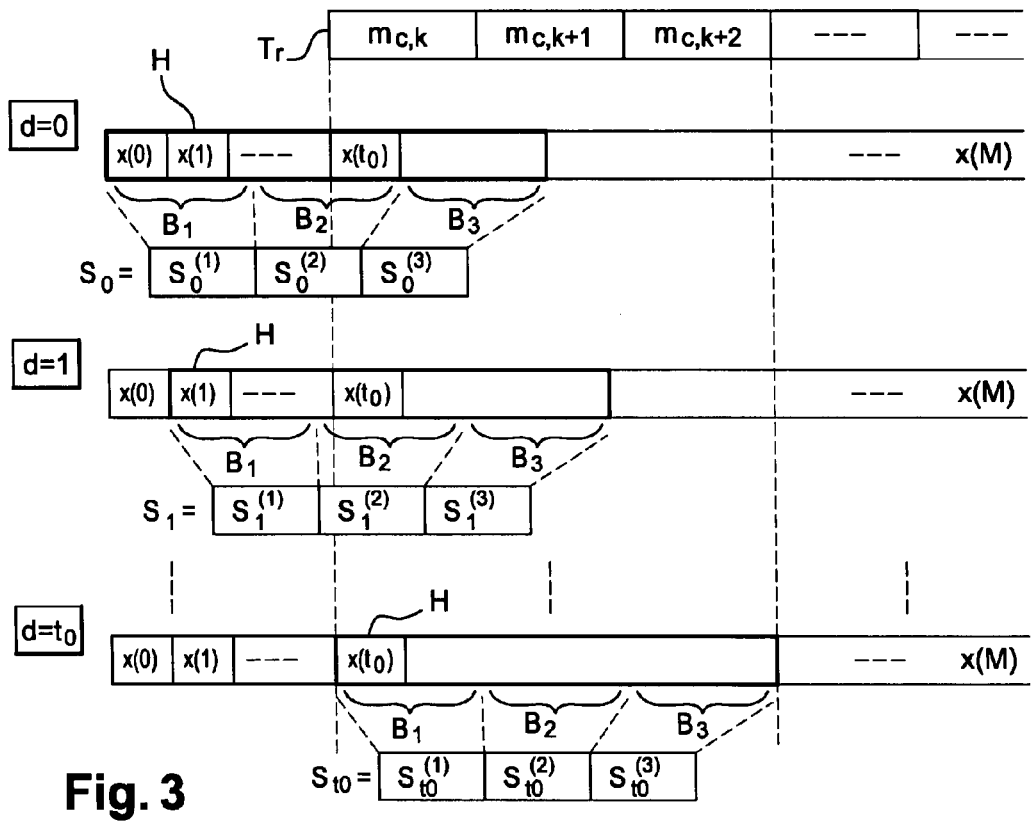
FIG. 3 is a theoretical diagram of a synchronization method of the invention.

Synchronization in accordance with the invention, as illustrated by FIG. 3, is effected by means of a window H sliding over the received frame $T_r$. The window is divided into K blocks $B_i$ having the same size as that of a code word $m_{c,k}$, i.e. $n_c$. The size of this synchronization window is therefore equal to $Kn_c$, and so once synchronization has been achieved the window contains exactly K code words. In this example, K=3.

The method typically computes a syndrome $S_d^{(i)}$ for each position of the window on the frame, d can vary from zero to $n_c$–1, and, for a given position for each block $B_i$, $S_d^{(i)}$ is therefore a vector of size $n_c$–$n_b$. An alternative is for the method to compute syndromes for a few positions of the window on the frame and, for those positions, for a few blocks $B_i$.

The method computes the number of null elements in the syndromes for a given position of the window H. The method takes for the estimate of to the position d for which the number of null elements for the syndromes associated with the same position of the window is the highest.

In the particular circumstance where the propagation channel does not introduce any errors, the method of the invention gives the same success rate as a method that takes the position of the window H for which the number of null syndromes $S_d^{(i)}$ is the highest. For this method, for the position d that corresponds to $t_0$, the syndromes associated with the K blocks are all null. In the method of the invention, the method yields $K(n_c-n_b)$ null elements.

In contrast, in the particular case where the propagation channel introduces transmission errors, the method of the invention can be more advantageous and offer a better success rate than a method that takes the position of the window H for which the number of null syndromes $S_d^{(i)}$ is the highest.

Figure 4:
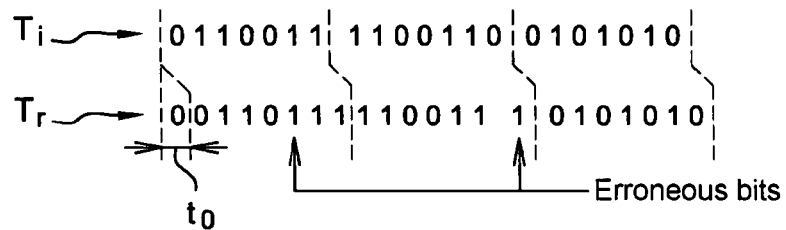
FIG. 4 is a diagram of a sent frame and a received frame.
Figure 5:
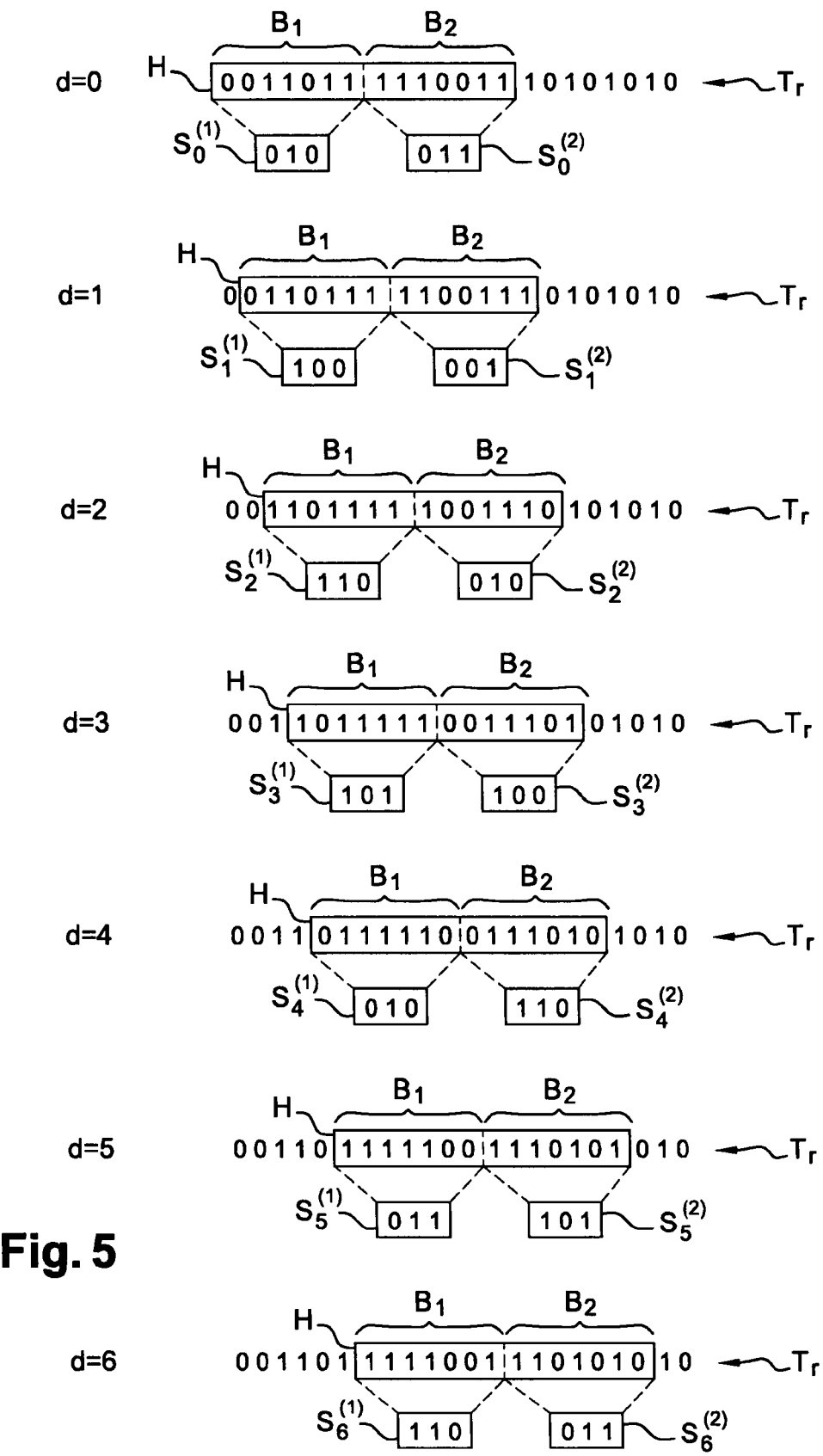
FIG. 5 represents various positions d on a received frame of a sliding window of a method of the invention.

The use of the method is illustrated by FIGS. 4 and 5, which correspond to one particular example of using the Hamming (7,4) code to code information bits.

FIG. 4 represents the sent frame $T_i$ and the received frame $T_r$. In this example, the received frame $T_r$ is delayed by one bit and contains two errors. The delay bit and the erroneous bits are represented in bold. The synchronization window is positioned on the received frame by the receiver. In the present example, the size of the window is 14 bits. The window can therefore cover two code words.

FIG. 5 represents this window H for various possible positions that correspond to d=0 to 6. The window H is divided into two blocks $B_1$ and $B_2$ of seven bits. From the bits of the block $B_1$, the method computes the associated syndrome $S_d^{(i)}$.

The method repeats this operation for the block $B_2$ to determine the syndrome $S_d^{(2)}$. In a method that retains the position of the window H for which the number of null syndromes $S_d^{(i)}$ is the highest, the method counts the number of null syndromes $S_0^{(1)}$, $S_0^{(2)}$ and obtains zero. According to the invention, the method counts the number of null elements and obtains three. The method then shifts the position of the window H and repeats the null element counting operations. For d=1, the number of null elements is equal to four and the number of null syndromes $S_1^{(1)}$, $S_1^{(2)}$ is equal to zero. For d=2, the number of null elements is equal to three and the number of null syndromes $S_2^{(1)}$, $S_2^{(2)}$ is equal to zero. For d=3, the number of null elements is equal to three and the number of null syndromes $S_3^{(1)}$, $S_3^{(2)}$ is equal to zero. For d=4, the number of null elements is equal to three and the number of null syndromes $S_4^{(1)}$, $S_4^{(2)}$ is equal to zero. For d=5, the number of null elements is equal to two and the number of null syndromes $S_5^{(1)}$, $S_5^{(2)}$ is equal to zero. For d=6, the number of null elements is equal to two and the number of null syndromes $S_6^{(1)}$, $S_6^{(2)}$ is equal to zero. The size of a code word used is seven. Consequently, a seventh shift reverts to a position with no shift, d=0; synchronization can be obtained only with a value of d varying between 0 and 6. In this noisy case, a method that takes the position of the window H for which the number of null syndromes $S_d^{(i)}$ is the highest cannot synchronize the receiver to the start of a code word: whatever the position of the window on the received frame $T_r$, such a method can obtain only non-null syndromes; synchronization fails. In contrast, the method of the invention advantageously synchronizes the receiver to the beginning of a code word: for the position of the window that corresponds to d=1 the number of null elements is four while for the other positions of the window the number of null elements is three or two. The method therefore selects the position d=1 as the synchronization position for the received frame because it corresponds to the highest number of null elements.

If a plurality of different positions of the window yield the same highest number of null elements, the method chooses one of those positions. The position chosen determines the frame start position. The choice can be effected arbitrarily, for example the position corresponding to the lowest value of d can be chosen. Alternatively, the choice can result from the use of a function including tests such as, for example, if the number of positions is odd then the position adopted is the center position of the various positions. In another embodiment the size of the synchronization window is increased.

Figure 6:
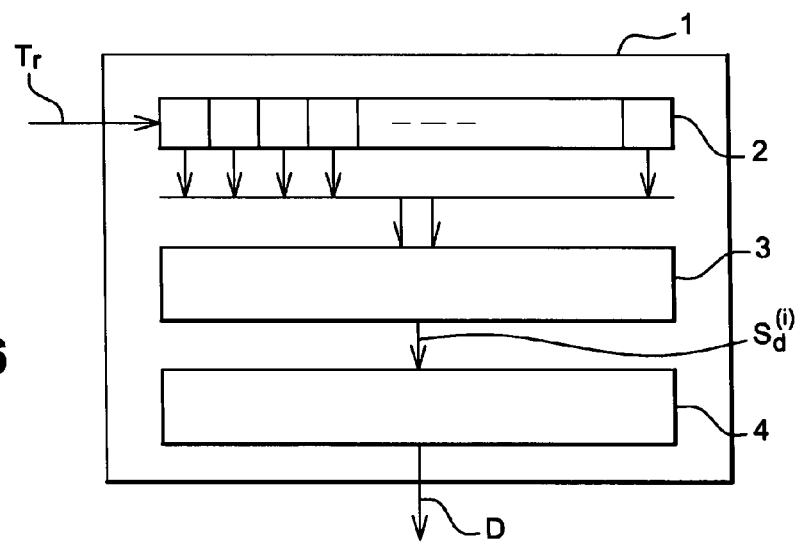
FIG. 6 represents diagrammatically a first particular embodiment of a synchronization device of the invention.

FIG. 6 represents diagrammatically a first particular embodiment of a synchronization device of the invention. The device 1 includes windowing means 2 sliding over a received frame $T_r$, means 3 for computing a syndrome $S_d^{(i)}$, and means 4 for determining a synchronization position D.

The sliding windowing means 2 are of size $Kn_c$. They are divided into K blocks $B_i$ of size $n_c$ equal to that of a code word. The frame start position is the same as one of several possible positions of the sliding windowing means along the received frame $T_r$. According to the illustration, which corresponds to a particular embodiment, the windowing means 22 can comprise a battery of registers forming a delay line that the bits of the frame received at a serial input enter. The window is sized by the choice of the parallel outputs of the battery. The blocks Bi are determined by how the computation means take these outputs into account.

The computation means 3 compute a syndrome $S_d^{(i)}$ for each of the K blocks Bi of the windowing means 2 and for the various positions of those windowing means 2. Each syndrome being made up of elements, the computation means 3 determine for a given syndrome the number $N_d$ of null elements of the syndrome. The computation means 3 typically consist of a computer such as a microprocessor.

The position determining means 4 determine the position for which the number of null elements of a syndrome is the highest. The frame start position D is the same as this position. The means 4 can be part of the computation means 3. Alternatively, they can constitute a particular component including logic operators.

A synchronization method and device of the invention work with all types of linear block code. Although the examples described relate to binary data, the invention works equally well with flexible data. By flexible data is meant received data that has not yet been compared to a threshold in order to be declared equal to binary zero or binary one. Flexible data therefore has a voltage level that can assume values that are not only the voltage levels of a binary zero or a binary one obtained after thresholding.

The invention applies to any type of cable or radio transmission system in which the data to be transmitted is discrete data, but it can further be applied to any information storage system.

The invention claimed is:

1. A method, executed by a processor of an electronic device, for synchronizing frames of data constituting code words by means of a window H sliding over a received frame $T_r$ of size $Kn_c$ divided into K blocks Bi of size $n_c$ the same as that of a code word, wherein the method comprises determining a start position D of the received frame $T_r$ that is one of several possible positions of the sliding window H along the received frame $T_r$ such that, for various possible positions of the window H, the determining of the start position D includes computing a syndrome $S_d^{(i)}$ for each block Bi, a syndrome having elements, and determining for each syndrome $S_d^{(i)}$ the number of null elements, the start position D of the received frame $T_r$ being a position for which the number of null elements of the syndromes $S_d^{(i)}$ computed for that position is the highest.

2. The method according to claim 1 for synchronizing data frames constituting code words, wherein syndromes $S_d^{(i)}$ are computed for each possible position of the sliding window H along the received frame $T_r$ and, for each of those positions, syndromes $S_d^{(i)}$ are computed for each of the K blocks Bi of the window H.

3. The method according to claim 1 for synchronizing data frames constituting code words, wherein the start position of the received frame $T_r$ is chosen arbitrarily from a plurality of possible positions obtained after computing syndromes.

4. The method according to claim 1 for synchronizing data frames constituting code words, wherein the data is flexible data.

5. The method according to claim 1 for synchronizing data frames constituting code words, wherein the data is binary data.

6. A method of receiving data constituting code words comprising a frame synchronization method according to claim 1.

7. A computer program stored on a non-transitory information medium, including program instructions adapted to implement a method according to claim 1 if said program is loaded into and executed in an electronic device.

8. A non-transitory information medium containing program instructions adapted to implement a method according to claim 1 if said program is loaded into and executed in an electronic device.

9. A device for synchronizing frames of data constituting code words to determine a frame start position, comprising:
windowing means sliding over a received frame $T_r$ of size $Kn_c$ divided into K blocks Bi of size $n_c$ the same as that of a code word, the start position D of the received frame $T_r$ being one of a plurality of possible positions of the sliding windowing means along the received frame $T_r$;
means for computing a syndrome $S_d^{(i)}$ made up of elements for various possible positions of the windowing means and for various blocks Bi of the windowing means, the computation means determining a number of null elements of the syndrome $S_d^{(i)}$; and
means for determining a position for which the number of null elements of the syndromes $S_d^{(i)}$ computed for that position is the highest, the start position D of the frame being determined to be that position.

10. A receiver for constituting code words, the receiver comprising a device according to claim 9 for synchronizing frames of data to determine a frame start position D.

11. A digital signal intended to be used in an electronic device for synchronizing data constituting code words by means of a window H sliding over a received frame $T_r$ of size $Kn_c$ divided into K blocks Bi of size $n_c$ equal to that of a code word, the synchronizing comprising determining a start position D of the received frame, the frame start position D being one of several possible positions of the sliding window H along the received frame $T_r$, the digital signal including codes for execution by the electronic device of the following step:
for various possible positions of the window H and for various blocks Bi of the window H, the electronic device computes a syndrome $S_d^{(i)}$ made up of elements and determines for each syndrome $S_d^{(i)}$ the number of null elements of the syndrome $S_d^{(i)}$, the start position D of the received frame $T_r$ being that for which the number of null elements of a syndrome $S_d^{(i)}$ is the highest.

\* \* \* \* \*

UNITED STATES PATENT AND TRADEMARK OFFICE
CERTIFICATE OF CORRECTION

PATENT NO. : 7,995,692 B2  Page 1 of 1
APPLICATION NO. : 11/884562
DATED : August 9, 2011
INVENTOR(S) : Sébastien Houcke It is certified that error appears in the above-identified patent and that said Letters Patent is hereby corrected as shown below:

On the Title Page item 73 should read

--(73) Assignee:   France Telecom, Paris (FR)
                   GET-ENST Bretagne, Brest Cedex (FR)--

Signed and Sealed this
Fourteenth Day of April, 2015

Michelle K. Lee
*Director of the United States Patent and Trademark Office*